United States Patent
Vaughn

(10) Patent No.: US 10,282,886 B2
(45) Date of Patent: May 7, 2019

(54) WEARABLE DEVICE PROVIDING MICRO-VISUALIZATION

(71) Applicant: Intel Corporation, Santa Clara, CA (US)

(72) Inventor: Robert L. Vaughn, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/752,753

(22) Filed: Jun. 26, 2015

(65) Prior Publication Data

US 2016/0379398 A1   Dec. 29, 2016

(51) Int. Cl.
G06F 1/16 (2006.01)
G06T 13/80 (2011.01)

(52) U.S. Cl.
CPC ............. *G06T 13/80* (2013.01); *G06F 1/163* (2013.01)

(58) Field of Classification Search
None
See application file for complete search history.

(56) References Cited

U.S. PATENT DOCUMENTS

| | | | | |
|---|---|---|---|---|
| 6,809,724 B1* | 10/2004 | Shiraishi | ................. | G06F 1/163 345/157 |
| 7,751,285 B1* | 7/2010 | Cain | .................... | G04G 9/0017 368/10 |
| 8,954,135 B2* | 2/2015 | Yuen | .............................. | 600/407 |
| 2002/0115478 A1* | 8/2002 | Fujisawa | ............. | H04M 1/6505 455/567 |
| 2012/0326863 A1 | 12/2012 | Johnson et al. | | |
| 2013/0342457 A1 | 12/2013 | Cox et al. | | |
| 2014/0045463 A1* | 2/2014 | Hsieh | ..................... | G06F 1/1643 455/411 |
| 2014/0127996 A1* | 5/2014 | Park | ...................... | H04W 4/027 455/41.1 |
| 2014/0295786 A1* | 10/2014 | Maier | ..................... | H04W 4/22 455/404.2 |
| 2015/0062160 A1 | 3/2015 | Sakamoto et al. | | |
| 2015/0347075 A1* | 12/2015 | Levesque | .............. | G06F 3/1423 345/3.1 |
| 2017/0011210 A1* | 1/2017 | Cheong | ................. | H04W 12/06 |

FOREIGN PATENT DOCUMENTS

WO   WO-2014143843   9/2014

OTHER PUBLICATIONS

International Search Report and Written Opinion for PCT Application No. PCT/US2016/031896 dated Aug. 19, 2016, 13 pages.

(Continued)

*Primary Examiner* — Yingchun He
(74) *Attorney, Agent, or Firm* — Womble Bond Dickinson (US) LLP

(57) ABSTRACT

Embodiments are generally directed to a wearable device providing micro-visualization. A wearable electronic device may include a processor to process data; an analytic engine to analyze information relating to a received data point and to generate a micro-visualization based at least in part on the information, wherein the micro-visualization includes at least an image and an animation of the image; and one or more display screens to display the micro-visualization.

20 Claims, 10 Drawing Sheets

(56) References Cited

OTHER PUBLICATIONS

"LinkMe Is an LED Smart Bracelet That Displays Scrolling Lines of Text," posted by Michael Seo on Apr. 3, 2013; retrieved on Jul. 17, 2015, at http://techcrunch.com/2013/04/03/linkme-is-an-led-smart-bracelet-that-displays-scrolling-lines-of-text/, 2 pages.
International Preliminary Report on Patentability and the Written Opinion of the International Searching Authority for International Application No. PCT/US2016/031896, dated Jan. 4, 2018, 10 pages.

\* cited by examiner

WEARABLE DEVICE PROVIDING MICRO-VISUALIZATION

TECHNICAL FIELD

Embodiments described herein generally relate to the field of electronic systems and, more particularly, to a wearable device providing micro-visualization.

BACKGROUND

Wearable electronic devices, commonly known as wearable devices, are providing increasingly sophisticated functions as the electronics become more powerful. Wearable devices are extremely convenient in that such device can be worn in the same manner as a wrist watch or other device.

Further, such devices may link with mobile computing devices such as smartphones, which have opened up many more functions through utilization of the powerful processing and communications enabled by such computing devices.

However, the form factor of wearable device makes the process of engaging with wearable devices very challenging because the surface of a wearable device is generally very small in comparison with a screen of a handheld computing device, thus limiting the type and quantity of information that can be provided by a conventional wearable device.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Figure 1:
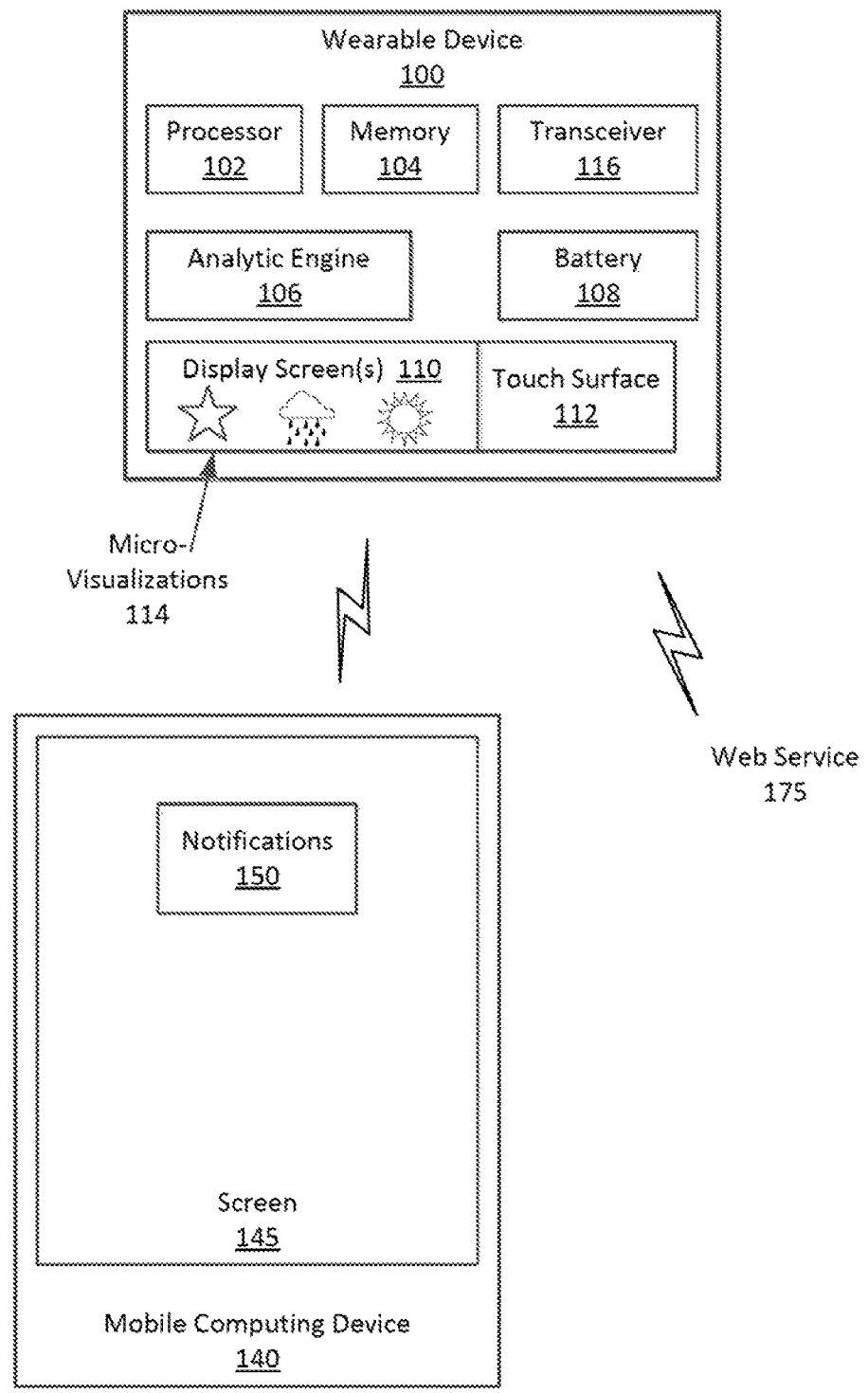
FIG. 1 is an illustration of a wearable device to provide micro-visualizations according to an embodiment.

Embodiments described herein are generally directed to a wearable device providing micro-visualization.

For the purposes of this description:

"Wearable electronic device", also referred to as a "wearable device" or "wearable", means an electronic device having a small form factor and being configured to be worn by a user. Wearable electronic devices include devices that are worn separately and devices that are incorporated into other items, such as devices integrated or embedded in an item of clothing or other similar item.

"Data point" means any data that may result in a notice or communication generated by an apparatus or system. Data points include, but are not limited to, a communication, such as text messages, email messages, received telephone calls, and social network updates; or a monitored data item, such as news items, financial reports, and other data streams.

"Mobile computing device" means any electronic computing device that may be transported, including, but not limited to, a smartphone, tablet computer, laptop or notebook computer, mobile internet device, or other similar electronic device.

As wearable systems, and in particular small form factor devices such as watches, bracelets, rings, pendants, and other devices, become more popular, conventional designs generally apply certain limited design philosophies:

(1) Treating the new form factors as essentially wearable smartphones;

(2) Applying a minimalist approach and using the system to display notifications as if the displays were little "marquee" systems with messages scrolling by one at a time; or (3) Using fixed icons to notify the user of functions such as email arrived, alarm set, battery level, and other simple functions.

However, the conventional designs of small form factor wearable devices (which may also be referred to herein as small wearables) allow the display of only very limited information. Further, because of the nature of wearable devices, the information that is provided is generally insecure as it can be easily seen by persons other than the user.

In some embodiments, advanced analytics and visualizations in wearable electronic devices enable the display of a tremendous amount of information with very small screens. In some embodiments, an apparatus, system, or method provides for:

(1) Application of a wearable screen as a SFF (small form factor) GUI (graphical user interface).

(2) Enables the tactile input for interactive visualizations, including provision of bi-directional feedback loop resulting in modification of visualizations.

(3) Utilizes visualization for securely obfuscating information.

In some embodiments, a smaller wearable is operable to visually represent items of importance to a user in an interactive, dynamic and animated manner. The system allows for:

(1) Operation utilizing a very small screen (which may be, for example, as small as ¼ inch square);

(2) Operation without using text notification;

(3) Context aware communication through the micro-visualizations;

and (4) Interactive operation utilizing touch response by a user.

In a conventional operation a user may be able to view certain information on the screen of a smartwatch or bracelet. Unfortunately, the SFF display is generally limited to a blinking icon for a heartbeat (i.e. for an exercise watch) or other such icon, or a string of characters to provide a certain phrase such as "new messages." Other conventional technology might include a ring tone notifying a person on a smartphone that a particular person is calling. However, the conventional notifications can provide only limited information to a user.

In some embodiments, a small wearable device provides for display of information in a dynamic and visual manner utilizing micro-visualizations that can be integrated into extremely small form factors and while still providing a wealth of information to the user by animating items of importance. As used herein, "micro-visualization" is a dynamically animated image that is generated by an analytic engine for one or more data points, the generation of the micro-visualization being based on multiple factors regarding the one or more data points.

For data points, items of importance (such as items having a certain level of priority) may include items such as text messages from a family member, email from one's manager, a particular stock price moving up or down more than a certain, news stories that are trending and increasing in popularity, etc. With any of these items it is possible identify a particular weight, trajectory or velocity associated with the data point (based on the relative importance for the use, and these active data points can then be translated into motion.

In some embodiments, a system generates images to represent active data points. In some embodiments, an apparatus, system, or method provides for dynamically animated images (micro-visualizations) associated with data points (such as a text message or phone call from a family memory) that that can change swirl, spin, fade, grow and even merge with other icons based on contextual cues derived from the data points.

Dynamic micro-visualizations can display a tremendous amount of information, and a very small screen is well suited as the medium of presenting these visualizations. In some embodiments, micro-visualizations combine with an analytic engine that has access to client aware contextual information (texts, emails, schedule, web sites/services, social media, GPS, etc.) allow for creation of a new user experience in communication with a wearable electronic device. As the human mind is capable of interpreting an animated image much more quickly than text, the recognition of the meaning of micro-visualizations may occur in a very short amount of time In some embodiments, because micro-visualizations are directed to a particular user for the representation of data points provide for more security than text notifications or other notifications for which the meaning is known and unchanging because of the natural aspect of obfuscation in generation of animated micro-visualizations.

FIG. 1 is an illustration of a wearable device to provide micro-visualizations according to an embodiment. In some embodiments, the wearable device 100 may include a processor 102 for processing of data and instructions, a memory 104 for storage of data and instructions, an analytic engine to evaluate received data points and to generate micro-visualizations 106, a battery 108 to power the device, one or more display screens 110 to present the generated micro-visualizations 114, and a touch surface 112 (which may include, but is not limited to, the display screens 110 if such display screens are touch screens) to receive touch responses from a user.

In some embodiments, a wearable device 100 may further include a transceiver 116 to provide wireless communications, such as to communicate with a mobile computing device 140 via a wireless connection (such as a Bluetooth™ or other connection) to a mobile computing device 140, such as a smartphone. In some embodiments, the mobile computing device 140 may receive or detect one or more data points, which may result in one or more notifications, such as the notifications 150 illustrated as being provided on a screen 145 of the mobile computing device 140.

Figure 12:
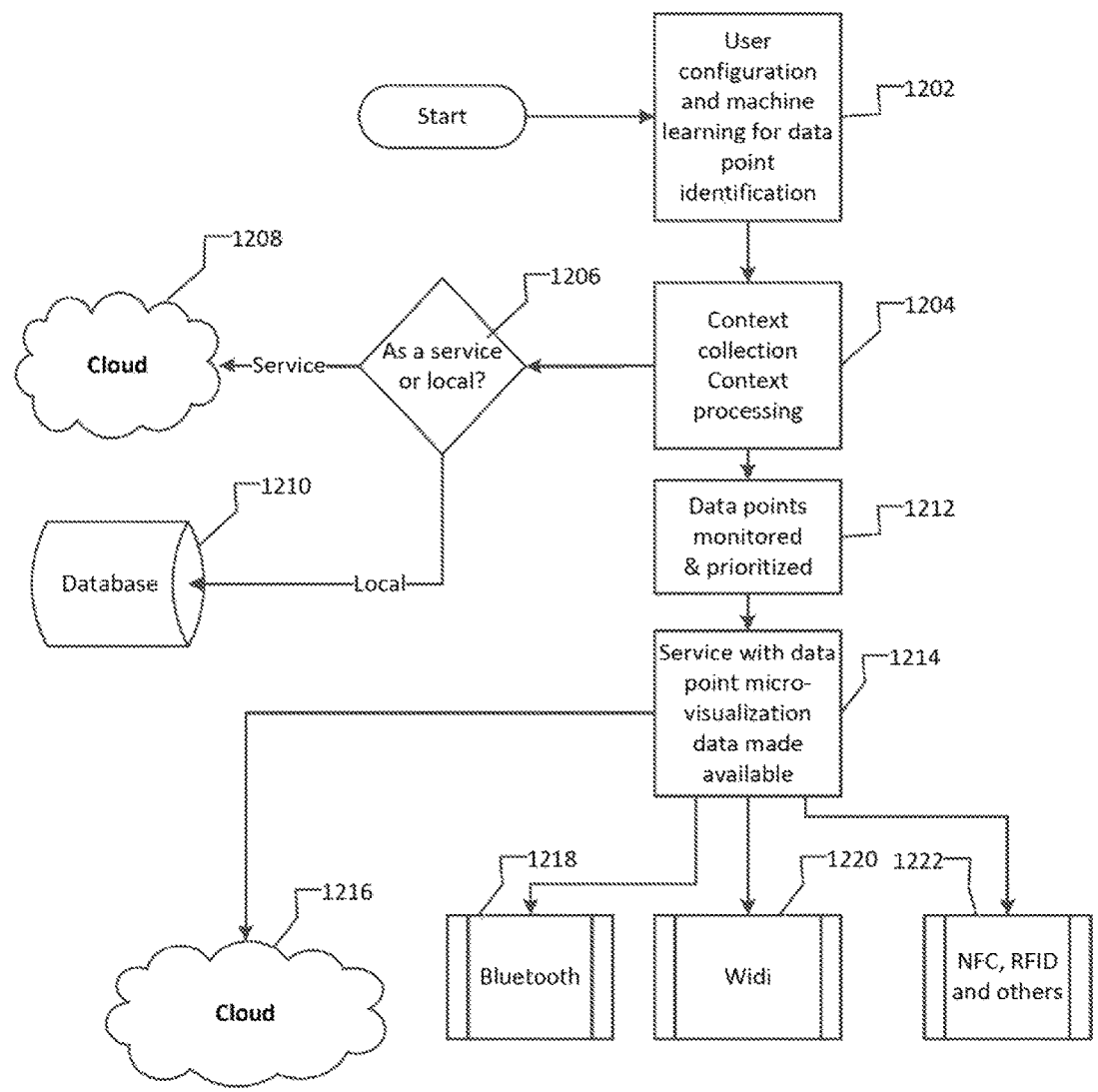
FIG. 12 is an illustration of a process to handle data points according to an embodiment.

In an alternative implementation, a wearable device 100 may be connected with a web service 175 or other network service, the wearable device utilizing the web service 175 to process and receive data points for the user. Services may include operations as illustrated in FIG. 12.

Figure 2:
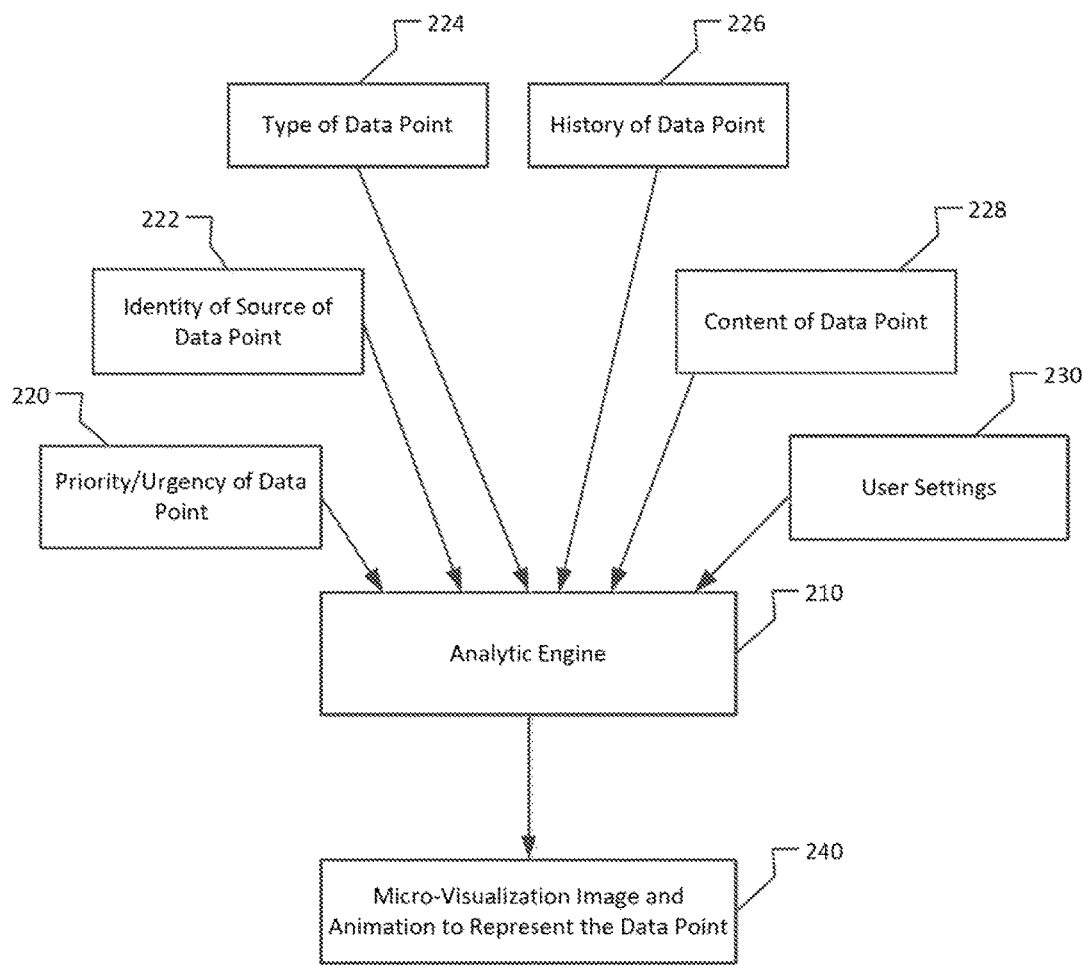
FIG. 2 is an illustration of the generation of a micro-visualizations by an analytic engine according to an embodiment.

FIG. 2 is an illustration of the generation of a micro-visualizations by an analytic engine according to an embodiment. In some embodiments, processing of data points for micro-visualizations may occur remotely as a service, or such processing may occur locally on a device, or a combination of remote and local processing. In some embodiments, an analytic engine 210 for micro-visualization, such as the analytic engine 116 of wearable electronic device 100 illustrated in FIG. 1, may analyze certain information relating to a received data point (or multiple data points, such as a group of related data points) to generate a micro-visualization for the data point. In some embodiments, the analytic engine is to further analyze information relating to a user of the wearable electronic device to generate the micro-visualization for the data point.

In some embodiments, the information relating to the data point may include, but is not limited to, a priority or urgency of the data point 220 (such as an urgent identifier on a message); an identity of the source of the data point 222 (wherein, for example, a text message from a spouse or family member may be processed differently than a text message from a business colleague); the type of data point 224 (such as a text message, email message, received telephone call); history regarding the data point 226 (such as the age of a message, whether multiple messages have been received from the same source, and other history information); and a content of the data point 230 (such as a social media item regarding a particular subject).

In some embodiments, information relating to a user of the wearable electronic device includes user settings 230, such as a particular color or shape assigned to a certain person, or other settings to connect images or animations with certain types or sources of data points. However, user settings are not limited to these examples, and may include any setting of a user to control a choice of micro-visualization for a data point.

Figure 3:
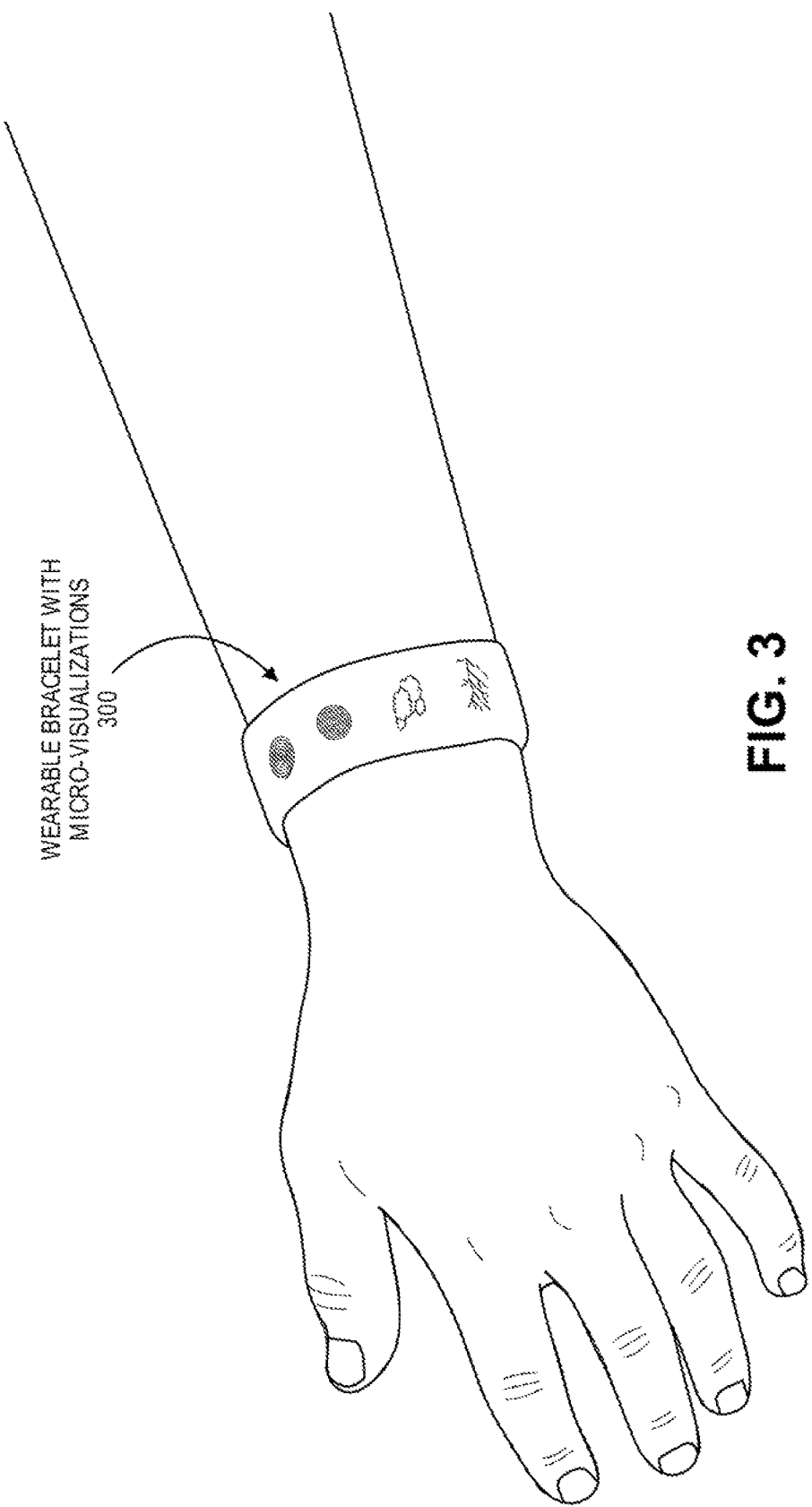
FIG. 3 illustrates a wearable bracelet with micro-visualization according to an embodiment.

In some embodiments, based at least in part on the relevant information 220-230, the analytic engine 210 is to generate a micro-visualization for one or more data points 240, including generation of the image and animation for the micro-visualization. FIGS. 3-9 provide illustration of wearable electronic devices to provide micro-visualizations according to an embodiment, wherein the wearable electronic devices may include:

FIG. 3 illustrates a wearable bracelet with micro-visualization according to an embodiment. In some embodiments, a wearable bracelet with micro-visualizations 300 may produce multiple images, such as the four micro-visualizations illustrated in FIG. 3.

Figure 4:
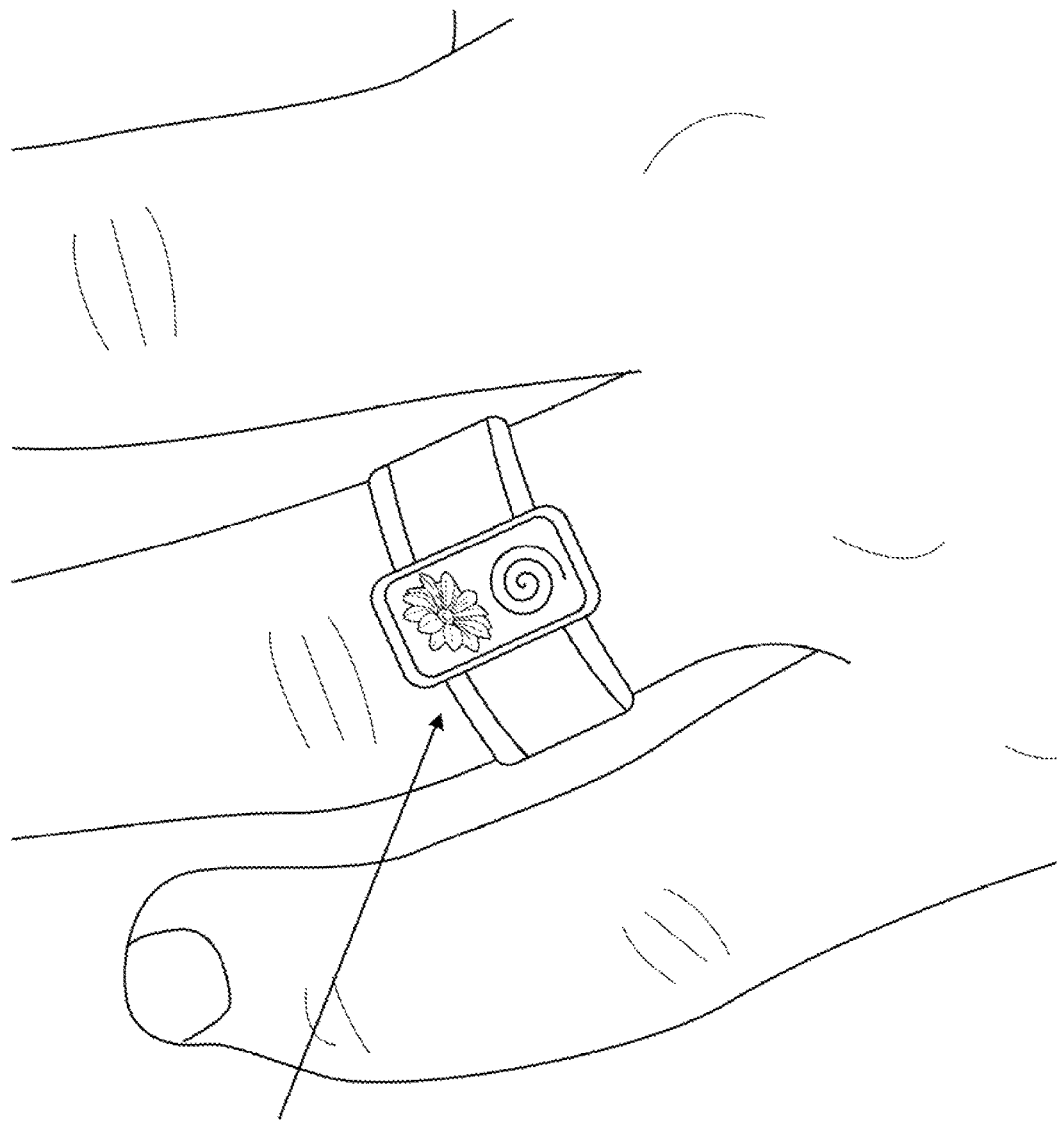
FIG. 4 illustrates a wearable ring with micro-visualization 400 according to an embodiment.
Figure 5:
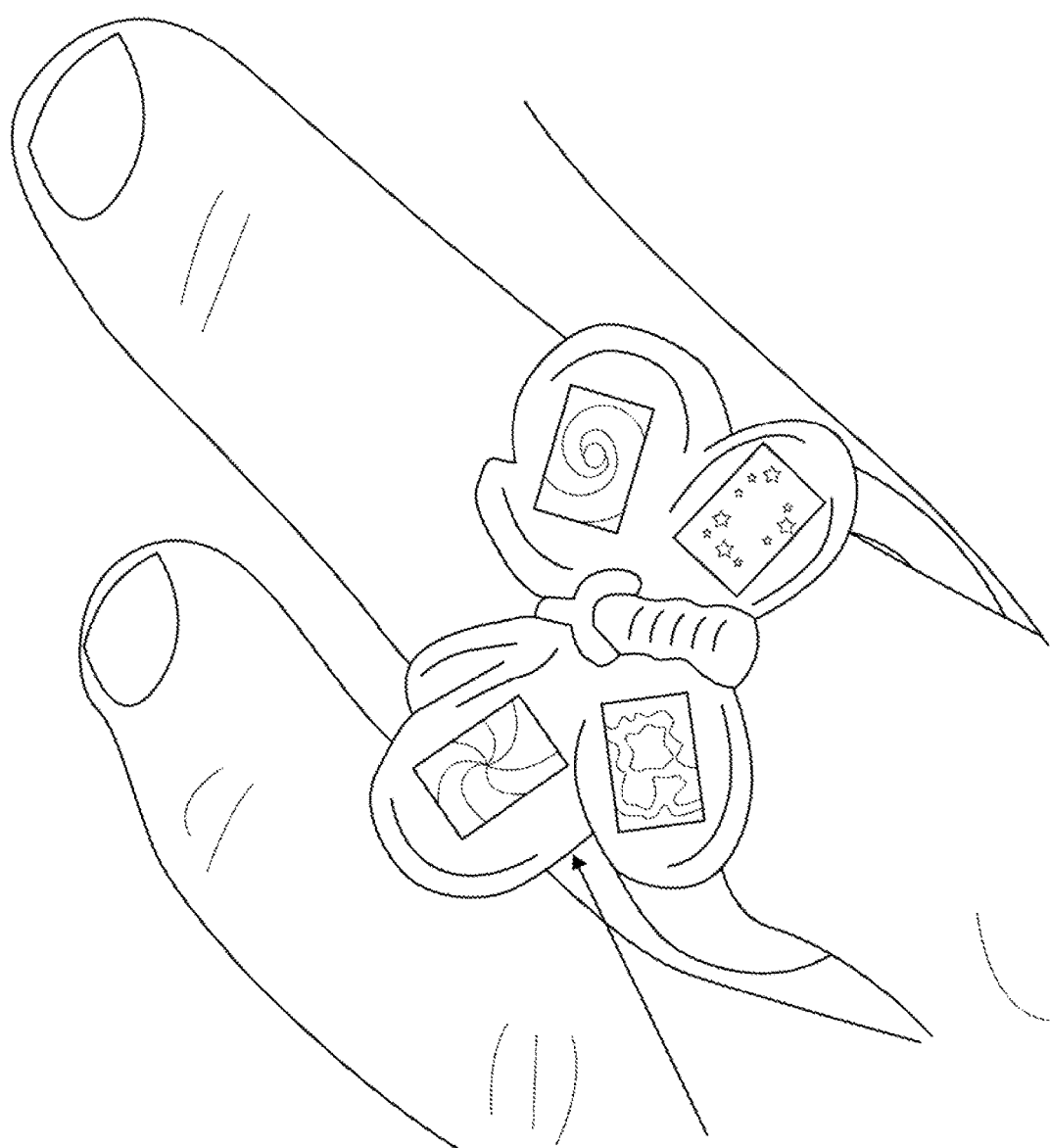
FIG. 5 illustrates a wearable child's ring with micro-visualization 500 according to an embodiment.

Embodiments may also be implemented in smaller devices, such as a ring. FIG. 4 illustrates a wearable ring with micro-visualization 400 according to an embodiment, and FIG. 5 illustrates a wearable child's ring with micro-visualization 500 according to an embodiment.

However, embodiments are not limited to these particular implementations, and may include any electronic device with one or more screens that are capable of producing one or more small images, such as a pendant, watch, small pocket device, or other devices.

Figure 6:
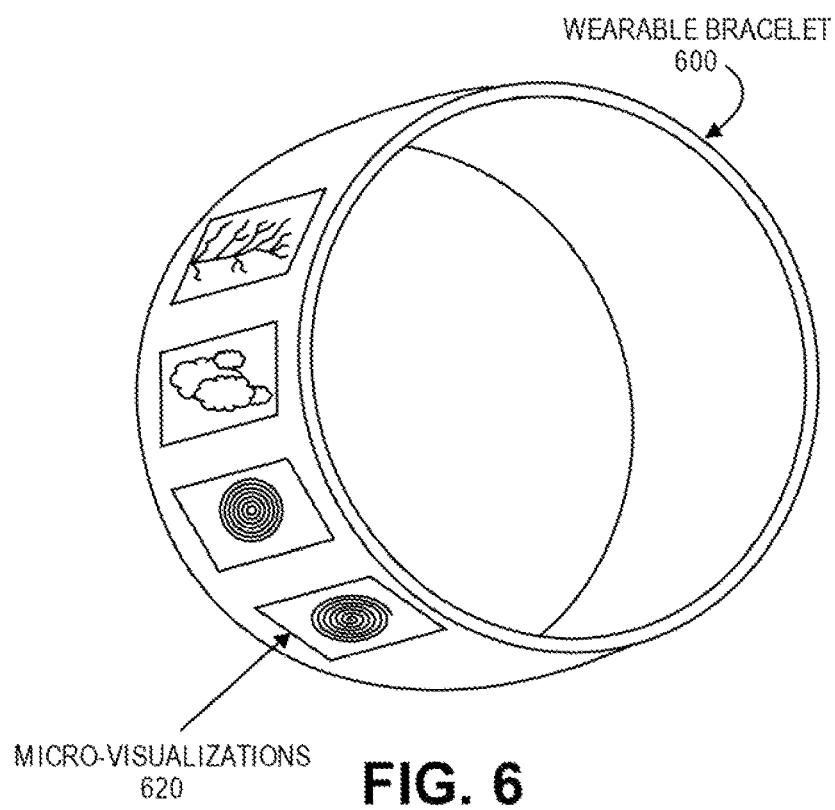
FIG. 6 illustrates another view of a wearable bracelet with micro-visualization according to an embodiment.
Figure 7:
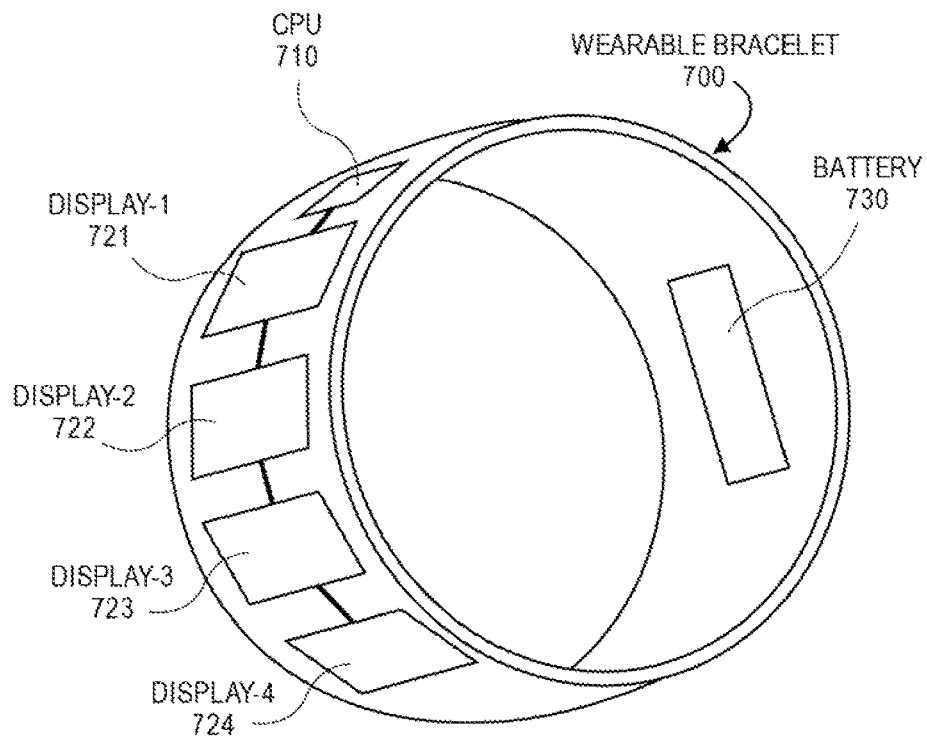
FIG. 7 is an illustration of elements of a wearable bracelet with micro-visualization according to an embodiment.

FIG. 6 illustrates another view of a wearable bracelet with micro-visualization according to an embodiment. As illustrated, a wearable bracelet 600 may produce multiple micro-visualizations 620. FIG. 7 is an illustration of elements of a wearable bracelet with micro-visualization according to an embodiment. In some embodiments, the wearable bracelet 700 includes a central processing unit (CPU) 710 to provide processing for the generation of micro-visualizations; multiple display screens for the presentation of the micro-visualizations (Display-1 721, Display-2 722, Display-3 723, and Display-4 724); and a battery 730 to power the device.

Figure 8:
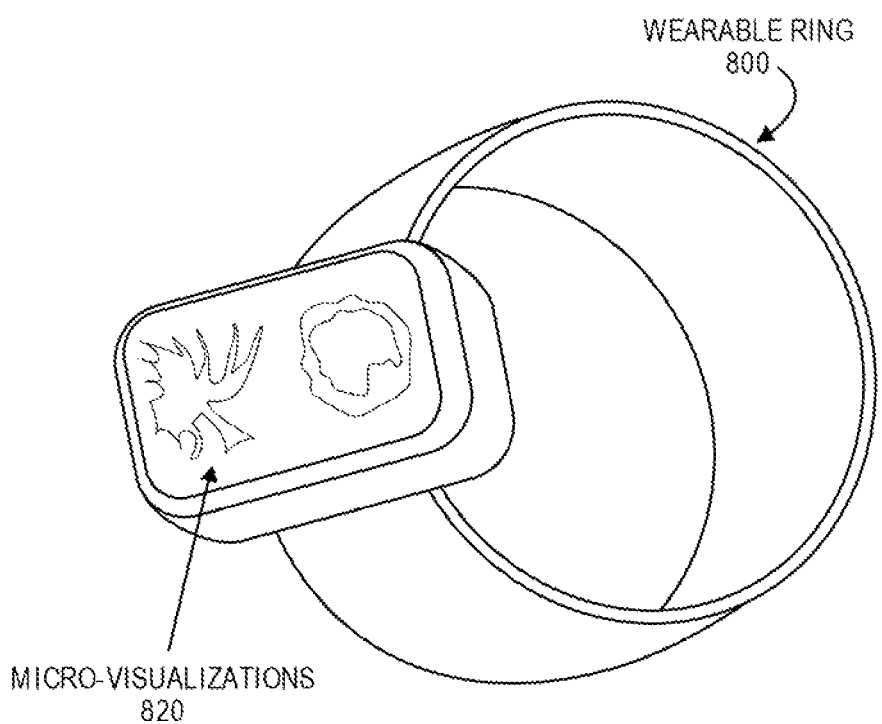
FIG. 8 illustrates another view of a wearable ring with micro-visualization according to an embodiment.
Figure 9:
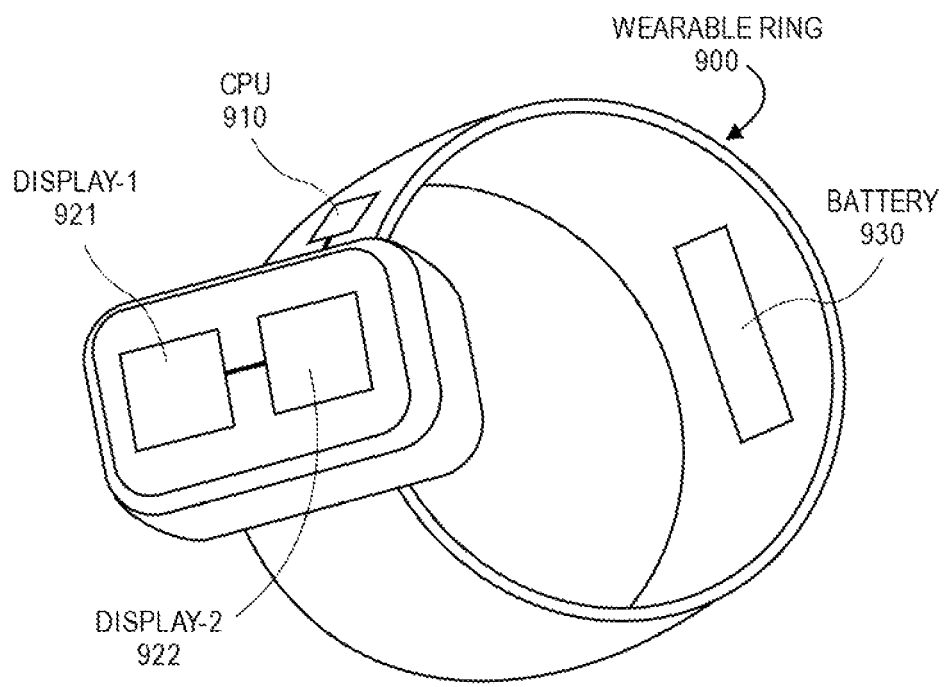
FIG. 9 is an illustration of elements of a wearable ring with micro-visualization according to an embodiment.

FIG. 8 illustrates another view of a wearable ring with micro-visualization according to an embodiment. As illustrated, a wearable ring 800 may produce multiple micro-visualizations 820. FIG. 9 is an illustration of elements of a wearable ring with micro-visualization according to an embodiment. In some embodiments, the wearable ring 900 includes a central processing unit (CPU) 910 to provide processing for the generation of micro-visualizations; multiple display screens for the presentation of the micro-visualizations (Display-1 921 and Display-2 922); and a battery 930 to power the device.

In an example, a wearable device may include a bracelet with a small and narrow screen, such as illustrated in FIGS. 3, 6, and 7. In some embodiments, the wearable device may display data in the following scenario:

(a) The wearable bracelet is synced or otherwise connected to a smartphone or a web service, such as illustrated in FIG. 1.

(b) The wearable bracelet is worn by a user.

(c) The wearable bracelet provides initial graphics, such as a graphical heart beat and a digital time.

(d) User commences to, for example, drive a motor vehicle, and the smartphone provides a signal indicating a received text. However, it is not practical or safe (and commonly is illegal) for user to view smartphone in response to the signal to see the text.

(e) User can safely and easily see the display on the wearable bracelet or other item.

(f) In the example, a text from the user's spouse arrives, the text being a currently active data point.

(g) In some embodiments, an analytic engine analyzes multiple factors to generate a micro-visualization for the active data point. In the example, the micro-visualization may be swirling image. The micro visualization may, for example, be presented as a pink animated swirl on the display. In this example, the color or other aspect of the micro-visualization may indicate the user's spouse as the source of the data point. Further, the particular image might indicate the type of data point or other information, or may be random.

(h) In some embodiments, upon the user touching the micro-visualization screen or other touch surface, the message may be displayed on the bracelet or on the smartphone (depending on the configuration dependent), or may cause an action to take place on the smartphone such as to transmit a return text indicating that, for example, the text is received but the user cannot currently view it.

(I) In some embodiments, upon a repeated data point or other indication of importance, such as the user's spouse texting multiple times in a short period of time, the animation or other aspect of the micro-visualization may change to indicate urgency. The change may include, but is not limited to, increasing the swirling of an image, or alternating changing color (such as alternating between an original pink color and a deep red color) to provide a visual clue that a certain micro-visualization has increased in urgency.

(j) In this example, a second data point arrives, the data point being an email from the manager of the user. In some embodiments, the system recognizes the nature of the email and is aware that the user considers emails from the user's manager to be important, and the device displays a second micro-visualization, which, in this particular example, is a blue swirl.

(k) In this example, the second data point is followed by an instant message (IM) from the user's manager, such message being a third data point, In response to the multiple data points from the same important source, the micro-visualization (blue swirl) may become more frantic in its movement.

(l) Further in the example, a fourth data point may be detected, where the data point may regard a change in a stock price for a particular company, such as the company employing the user, or other news item. Another micro-visualization may be produced, wherein the direction of movement in the stock price may be represented by a particular color or animation pattern for the micro-visualization.

Thus, as provided in the example, from glancing at a small wearable device, which may be as small as a jewel sized display on a ring, the user may discern that the user's spouse has urgent information; that an email with a question from the user's manager is awaiting the user's response; and that the stock of the user's company is rising or falling.

Figure 10:
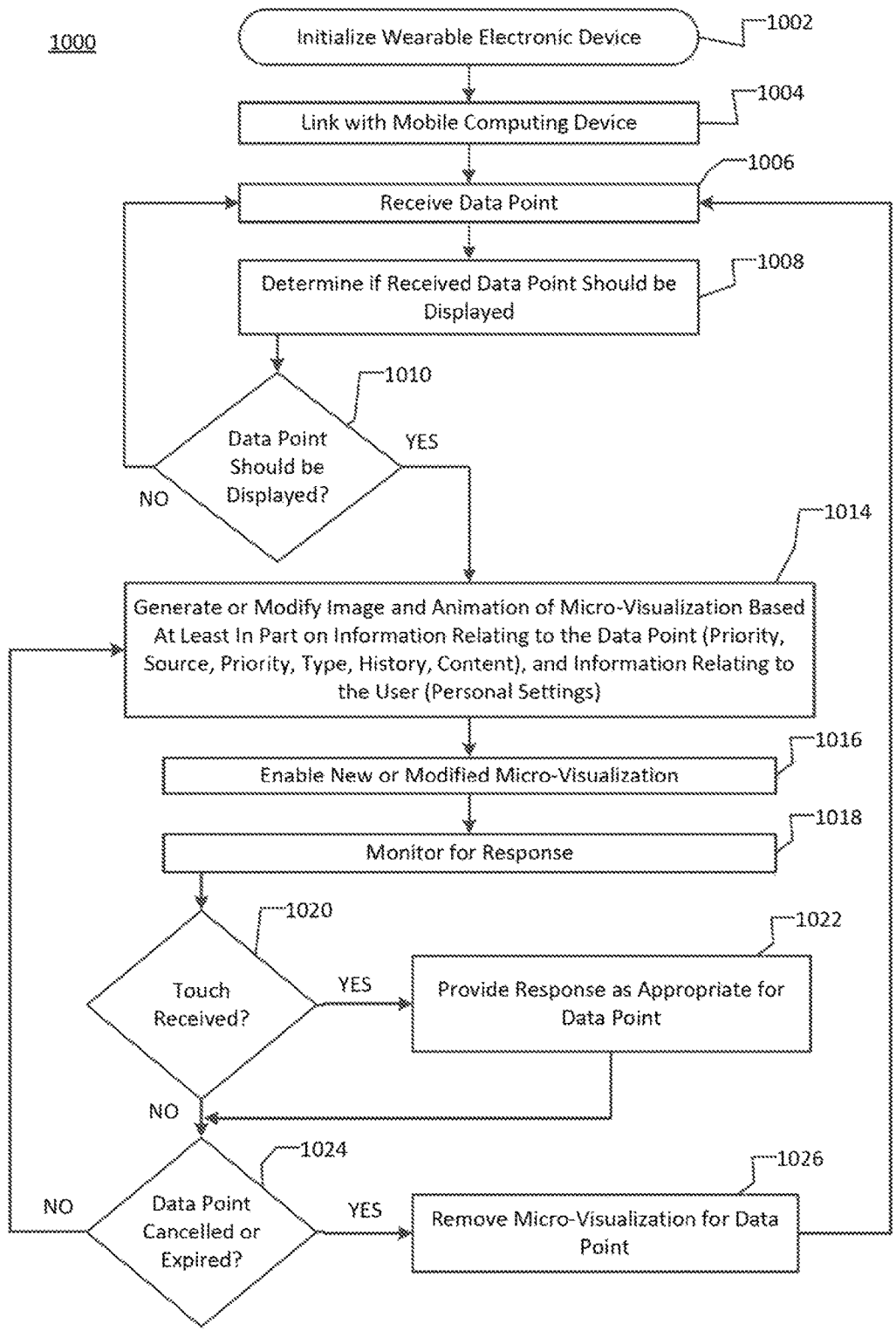
FIG. 10 is a flowchart to illustrate a process for providing micro-visualizations according to an embodiment.

FIG. 10 is a flowchart to illustrate a process for providing micro-visualizations according to an embodiment. In some embodiments, a process 1000 includes initializing a wearable electronic device 1002. In some embodiments, the process may include linking with a mobile computing device 1004, but embodiments are not limited to this process. In an alternative process, the wearable electronic device may link with a web service or other network service.

In some embodiments, the process continues with receiving a data point 1006, such as receiving the data point from the smartphone monitoring for messages and notifications. In some embodiments, upon receiving a data point at the wearable device, the device is to determine if the data point is of type and importance that should be displayed 1010, wherein, because of the limited display space, the determination may include determining if the data point is of a type or importance to displace an existing micro-visualization. In varying embodiments, data point identification may be provided as a remote service or may be provided locally on a device, as illustrated in FIG. 12.

If the data point should be displayed 1010, an analytic engine of the wearable device is to generate or modify a micro-visualization for the data point, including generating or modifying an image and animation of a micro-visualization for the data point, based at least in part on information relating to the data point, such as the source of the data point, a priority of the data point, the type of data point (such as a text message or email message) a history of the data point (such as if multiple messages from the same source have been received), and content of the data point 1014. In some embodiments, generating or modifying a micro-visualization for the data point is further based at least in part on information related to the user of the device, such as personal settings for the user. In some embodiments, the new or modified micro-visualization is enabled 1016 and displayed on the one or more displays of the wearable device.

In some embodiments, the process may continue with monitoring for any touch response to the micro-visualization 1018, such as a finger tap for a first meaning (such as to acknowledge the message) or a swipe for a second meaning (such as to provide a busy or delay indication). In some embodiments, if a touch is received 1020, the process may provide for a response as appropriate for the data point 1022. In an example, a return text message may be automatically sent for a text message data point.

In some embodiments, the process may continue with a determination whether a data point has been cancelled or has expired 1024, such as, for example, certain data points only remaining active for a certain amount of time. If so, the micro-visualization for the data point may then be removed 1026.

Figure 11:
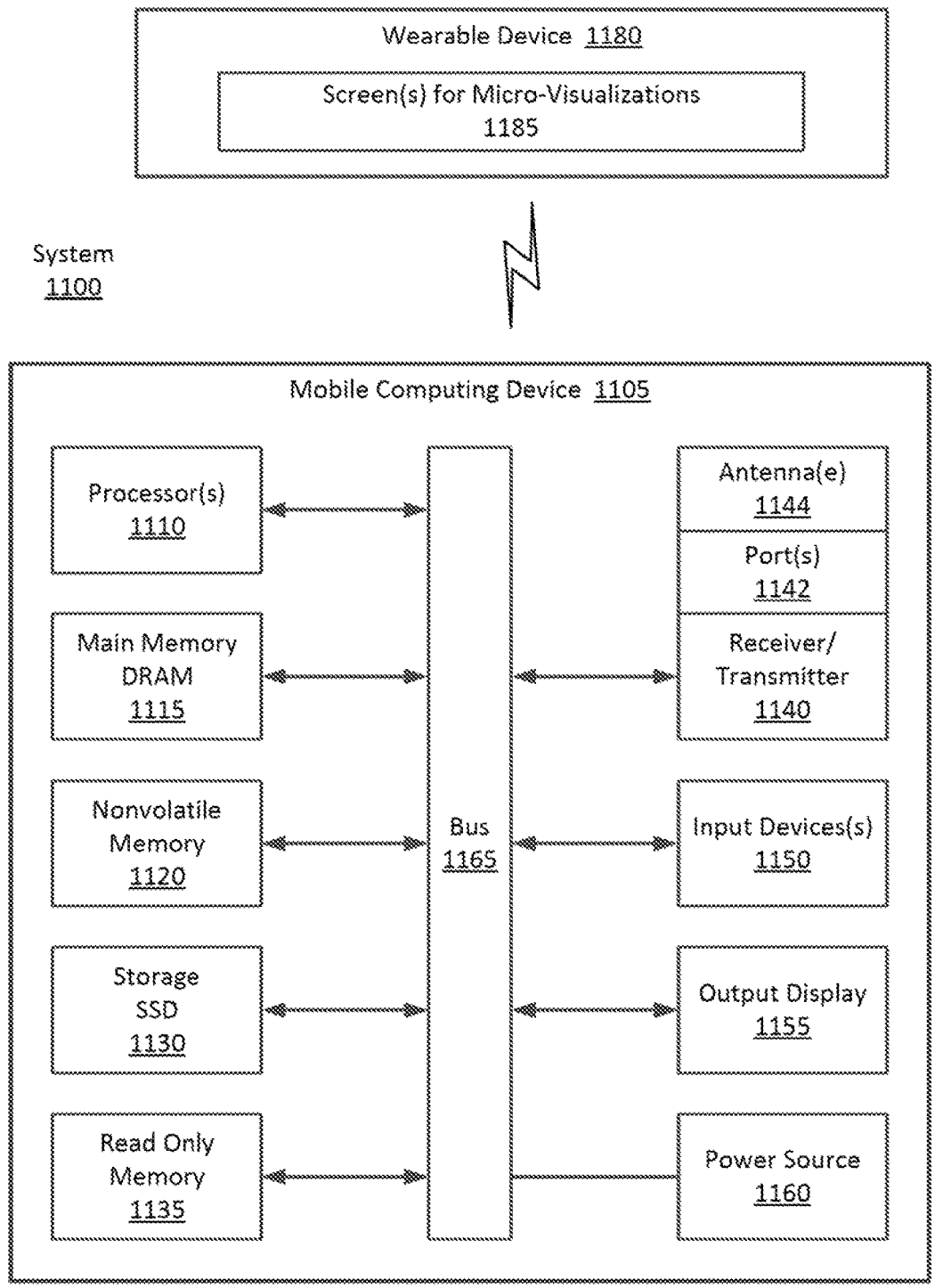
FIG. 11 is an illustration of a system to provide micro-visualizations according to an embodiment.

FIG. 11 is an illustration of a system to provide micro-visualizations according to an embodiment. In this illustration, certain standard and well-known components that are not germane to the present description are not shown. Elements shown as separate elements may be combined, including, for example, an SoC (System on Chip) combining multiple elements on a single chip.

In some embodiments, a system to provide micro-visualizations 1100 includes a wearable device 1180 with one or more screens for micro-visualizations 1185, such as wearable device 100 illustrated in FIG. 1, which may be implemented as, for example, one of the devices illustrated in FIGS. 3-9. In some embodiments, the wearable device 1080 includes an interface for connection with a mobile computing device 1105, including a wireless connection between the wearable device 1180 and the mobile computing device 1105.

In some embodiments, the device 1105 may include a processing means such as one or more processors 1110 coupled to one or more buses or interconnects for processing information, shown in general as bus 1165. The processors 1110 may comprise one or more physical processors and one or more logical processors. In some embodiments, the processors may include one or more general-purpose processors or special-processor processors.

The bus 1165 is a communication means for transmission of data. The bus 1165 is illustrated as a single bus for simplicity, but may represent multiple different interconnects or buses and the component connections to such interconnects or buses may vary. The bus 1165 shown in FIG. 11 is an abstraction that represents any one or more separate physical buses, point-to-point connections, or both connected by appropriate bridges, adapters, or controllers.

In some embodiments, the device 1105 further comprises a random access memory (RAM) or other dynamic storage device or element as a main memory 1115 for storing information and instructions to be executed by the processors 1110. Main memory 1115 may include, but is not limited to, dynamic random access memory (DRAM).

The system 1100 also may comprise a nonvolatile memory 1120, storage device such as a solid state drive (SSD) 1130, and a read only memory (ROM) 1135 or other static storage device for storing static information and instructions for the processors 1110.

In some embodiments, the device 1105 includes one or more transmitters or receivers 1140 coupled to the bus 1165. In some embodiments, the device 1105 may include one or more antennae 1144, such as dipole or monopole antennae, for the transmission and reception of data via wireless communication using a wireless transmitter, receiver, or both, and one or more ports 1142 for the transmission and reception of data via wired communications. Wireless communication includes, but is not limited to, Wi-Fi, Bluetooth™, near field communication, and other wireless communication standards.

In some embodiments, device 1105 includes one or more input devices 1150 for the input of data, including hard and soft buttons, a joy stick, a mouse or other pointing device, a keyboard, voice command system, or gesture recognition system.

In some embodiments, the device 1105 includes an output display 1155, where the display 1155 may include a liquid crystal display (LCD) or any other display technology, for displaying information or content to a user. In some environments, the display 1155 may include a touch-screen that is also utilized as at least a part of an input device 1150. Output display 1155 may further include audio output, including one or more speakers, audio output jacks, or other audio, and other output to the user.

The device 1105 may also comprise a battery or other power source 1160, which may include a solar cell, a fuel cell, a charged capacitor, near field inductive coupling, or other system or device for providing or generating power in the system 1100. The power provided by the power source 1160 may be distributed as required to elements of the system 1100.

FIG. 12 is an illustration of a process to handle data points according to an embodiment. In some embodiments, user configuration and machine learning are utilized in identification of data points 1202. In some embodiments, context collection and processing provides context data for data point identification 1204. In some embodiments, data point identification may occur as a part of a service or locally on a device 1206. For a data point micro-visualization service, context information may be stored in cloud storage 1208, and, for local processing, context information may be stored on a local database 1210.

In some embodiments, data points are monitored and prioritized 1212. In some embodiments, for a service providing data point micro-visualization 1214, the micro-visualizations may be provided via, for example, cloud storage 1216, Bluetooth™ 1218, WiDi™ (Intel Wireless Display) 1220, or other communication, such as NRC (Near Field Communication), RFID (Radio-Frequency Identification), and others 1222.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, compact disk read-only memory (CD-ROM), and magneto-optical disks, read-only memory (ROM), random access memory (RAM), erasable programmable read-only memory (EPROM), electrically-erasable programmable read-only memory (EEPROM), magnet or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

In some embodiments, a wearable electronic device includes a processor to process data; an analytic engine to analyze information relating to a received data point and to generate a micro-visualization based at least in part on the information, wherein the micro-visualization includes at least an image and an animation of the image; and one or more display screens to display the micro-visualization.

In some embodiments, the data point includes one or a communication or a monitored data item.

In some embodiments, the information relating to the data point includes one or more of a priority or urgency of the data point; an identity of a source of the data point; a type of the data point; a history regarding the data point; and a content of the data point.

In some embodiments, the analytic engine is further to analyze information relating to a user of the device in the generation of the micro-visualization.

In some embodiments, the information relating to the user of the device includes user settings to control a choice of micro-visualizations for data points.

In some embodiments, the user settings include one or more settings to connect certain images or animations with one or more of types of data point and sources of data points.

In some embodiments, the device further includes an interface for a connection with a mobile computing device.

In some embodiments, a method includes initializing a wearable electronic device; receiving a data point; determining if the data point should be displayed; if the data point should be displayed, generating a micro-visualization for the data point based at least in part on information regarding the data point; and displaying the generated micro-visualization on a display screen of the wearable electronic device.

In some embodiments, the data point includes one of a communication or a monitored data item.

In some embodiments, the information relating to the data point includes one or more of: a priority or urgency of the data point; an identity of a source of the data point; a type of the data point; a history regarding the data point; and a content of the data point.

In some embodiments, generating a micro-visualization for the data point is further based at least in part on information regarding a user of the device.

In some embodiments, the information relating to the user of the device includes user settings to control a choice of micro-visualizations for data points.

In some embodiments, the user settings include one or more settings to connect certain images or animations with one or more of types of data point and sources of data points.

In some embodiments, the method further includes linking the wearable electronic device to a mobile computing device.

In some embodiments, the method further includes obtaining an identification of the data point.

In some embodiments, the identification of the data point is based at least in part on one or more of a user configuration and machine learning.

In some embodiments, identification of the data point is received as a service.

In some embodiments, a non-transitory computer-readable storage medium having stored thereon data representing sequences of instructions that, when executed by a processor, cause the processor to perform operations comprising: initializing a wearable electronic device; receiving a data point; determining if the data point should be displayed; if the data point should be displayed, generating a micro-visualization for the data point based at least in part on information regarding the data point; and displaying the generated micro-visualization on a screen of the wearable electronic device.

In some embodiments, the data point includes one of a communication or a monitored data item.

In some embodiments, an apparatus includes means for initializing a wearable electronic device; means for receiving a data point; means for determining if the data point should be displayed; means for generating a micro-visualization for the data point based at least in part on information regarding the data point if the data point should be displayed; and means for displaying the generated micro-visualization on a screen of the wearable electronic device.

In some embodiments, the data point includes one of a communication or a monitored data item.

In some embodiments, generating a micro-visualization for the data point is further based at least in part on information regarding a user of the device.

What is claimed is:

1. A wearable electronic device comprising:
a processor to process data;
a receiver to receive one or more data points and a transmitter to transmit a response;
an analytic engine to:
analyze a plurality of factors of information regarding a first received data point, the first received data point including one or more of a received communication from an individual or a monitored data item, wherein the plurality of factors of information regarding the first received data point includes at least: a type of data point, and a priority or urgency of the data point,
determine if the first received data point should be displayed based on the plurality of factors of information regarding the first received data point, and
upon determining that the first received data point should be displayed, generate a micro-visualization to represent the first received data point, wherein generating the micro-visualization to represent the first received data point includes the analytic engine to select an image and an animation of the image for the micro-visualization based on the plurality of factors of information regarding the first received data point;
one or more display screens to display the micro-visualization, wherein the micro-visualization has the animation that is modified in response to the analytic engine determining that the priority has changed after determining that the first received data point is a repeated communication from the individual in a time period that indicates urgency; and
a touch surface to receive touch responses to micro-visualizations;
wherein, for a received communication, the wearable electronic device is to generate and transmit, to the individual, a response to the received communication via the transmitter upon detection of a first touch response on the touch surface.

2. The device of claim 1, wherein the plurality of factors of information regarding the first received data point further includes at least one of:
an identity of a source of the data point;
a history regarding the data point; or
a content of the data point.

3. The device of claim 2, wherein the analytic engine is further to analyze information relating to a user of the device in the generation of the micro-visualization to represent the first received data point.

4. The device of claim 3, wherein the information relating to the user of the device further includes user settings to control the generation of micro-visualizations to represent certain data points.

5. The device of claim 4, wherein the user settings include one or more settings to connect certain images or animations with one or more of types of data points and sources of data points.

6. The device of claim 1, further comprising an interface for a connection with a mobile computing device, wherein the device is to receive data points from the mobile device via the interface.

7. The device of claim 1, wherein the one or more display screens includes one or more touch screens, and wherein the one or more touch screens include the touch surface.

8. The device of claim 1, wherein the first touch response is one of a touch or swipe on the touch surface.

9. The device of claim 1, wherein the analytic engine is further to determine whether any displayed data point has been cancelled or is expired, and, upon determining that a data point has been cancelled or is expired, the analytic engine to remove the micro-visualization for the data point.

10. A method comprising:
initializing a wearable electronic device;
receiving a first data point using a receiver of the wearable electronic device, the first data point including one or more of a received communication from an individual or a monitored data item;
determining by an analytic engine if the first data point should be displayed based on a plurality of factors of information regarding the first data point including at least: a type of the data point and a priority or urgency of the data point;
upon determining that the first data point should be displayed, generating by the analytic engine a micro-visualization to represent the first data point, wherein the generation of the micro-visualization to represent the first data point includes the analytic engine to select an image and an animation of the image for the micro-visualization based on the plurality of factors of information regarding the first data point that are analyzed by the analytic engine;
displaying the generated micro-visualization on a display screen of the wearable electronic device, wherein the micro-visualization has the animation that is modified in response to the analytic engine determining that the priority has changed after determining that the first received data point is a repeated communication from the individual in a time period that indicates urgency; and
upon receiving a touch response to the micro-visualization on a touch surface of the wearable electronic device, generating and transmitting, to the individual, a response communication using a transmitter of the wearable electronic device.

11. The method of claim 10, wherein the plurality of factors of information regarding the first data point includes at least one of:
an identity of a source of the data point;
a history regarding the data point; or
a content of the data point.

12. The method of claim 11, wherein generating the micro-visualization to represent the first data point is further based at least in part on information regarding a user of the wearable electronic device.

13. The method of claim 12, wherein the information relating to the user of the wearable electronic device includes user settings to control the generation of micro-visualizations to represent certain data points.

14. The method of claim 13, wherein the user settings include one or more settings to connect certain images or animations with one or more of types of data points and sources of data points.

15. The method of claim 10, further comprising linking the wearable electronic device to a mobile computing device and receiving one or more data points from the mobile computing device.

16. The method of claim 10, further comprising obtaining an identification of the first data point.

17. The method of claim 16, wherein identification of the first data point is based at least in part on a user configuration.

18. The method of claim 16, wherein identification of the first data point is received as a service.

19. A non-transitory computer-readable storage medium having stored thereon data representing sequences of instructions that, when executed by a processor, cause the processor to perform operations comprising:
   initializing a wearable electronic device;
   receiving a first data point using a receiver of the wearable electronic device, the first data point including one or more of a received communication from an individual or a monitored data item;
   determining by an analytic engine if the first data point should be displayed based on a plurality of factors of information regarding the first data point including at least: a type of the data point and a priority or urgency of the data point;
   upon determining that the first data point should be displayed, generating by the analytic engine a micro-visualization to represent the first data point, wherein the generation of the micro-visualization to represent the first data point includes the analytic engine to select an image and an animation of the image for the micro-visualization based on the plurality of factors of information regarding the first data point that are analyzed by the analytic engine;
   displaying the generated micro-visualization on a display screen of the wearable electronic device, wherein the micro-visualization has the animation that is modified in response to the analytic engine determining that the priority has changed after determining that the first received data point is a repeated communication from the individual in a time period that indicates urgency; and
   upon receiving a touch response to the micro-visualization on a touch surface of the wearable electronic device, generating and transmitting, to the individual, a response communication using a transmitter of the wearable electronic device.

20. The medium of claim 19, wherein generating the micro-visualization to represent the first data point is further based at least in part on information regarding a user of the wearable electronic device.

* * * * *